United States Patent
Kim et al.

(10) Patent No.: US 8,137,845 B2
(45) Date of Patent: Mar. 20, 2012

(54) NEGATIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

(75) Inventors: Yang-Soo Kim, Suwon-si (KR); Wan-Uk Choi, Suwon-si (KR); Ri-Zhu Yin, Suwon-si (KR); Joon-Sup Kim, Suwon-si (KR); Sung-Soo Kim, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 627 days.

(21) Appl. No.: 11/984,531

(22) Filed: Nov. 19, 2007

(65) Prior Publication Data
US 2008/0145758 A1 Jun. 19, 2008

(30) Foreign Application Priority Data
Nov. 20, 2006 (KR) ........................ 10-2006-0114535

(51) Int. Cl.
*H01M 4/13* (2010.01)
*H01M 4/131* (2010.01)
*H01M 4/134* (2010.01)
*B01J 23/00* (2006.01)

(52) U.S. Cl. ............ 429/231.95; 429/231.5; 252/182.1; 502/100

(58) Field of Classification Search ................ 429/218.1, 429/219–221, 223–224, 226, 229, 231.1–231.2, 429/231.5, 231.9–231.95; 252/182.1; 502/101, 502/100
See application file for complete search history.

(56) References Cited

U.S. PATENT DOCUMENTS

| | | | | |
|---|---|---|---|---|
| 5,284,721 A | * | 2/1994 | Beard | 429/343 |
| 5,378,560 A | * | 1/1995 | Tomiyama | 429/217 |
| 5,506,075 A | * | 4/1996 | Iwasaki et al. | 429/342 |
| 6,221,531 B1 | | 4/2001 | Vaughey et al. | |
| 7,682,746 B2 | | 3/2010 | Koshina et al. | |
| 2006/0222950 A1 | | 10/2006 | Koshina | |

FOREIGN PATENT DOCUMENTS

| | | | |
|---|---|---|---|
| CN | 1841816 A | | 10/2006 |
| EP | 1708296 | | 10/2006 |
| JP | 07014580 A | * | 1/1995 |
| JP | 2001216962 A | | 8/2001 |

(Continued)

OTHER PUBLICATIONS

Machine Translation and Abstract in English of JP 07-014580.*
Search Report from the European Patent Office issued in Applicant's corresponding European Patent Application No. 07120913.4-1227 dated Feb. 19, 2008.

(Continued)

*Primary Examiner* — Barbara L. Gilliam
*Assistant Examiner* — Claire L Roe
(74) *Attorney, Agent, or Firm* — Robert E. Bushnell, Esq.

(57) ABSTRACT

A negative active material for a rechargeable lithium battery includes a compound represented by the following Formula 1:

$$Li_{1+x}Ti_{1-x-y}M_yO_{2+z} \qquad (1)$$

wherein, in the above Formula 1, $0.01 \leq x \leq 0.5$, $0 \leq y \leq 0.3$, $-0.2 \leq z \leq 0.2$, and M is an element selected from the group consisting of V, Cr, Mn, Fe, Co, Ni, Cu, Zn, Zr, Nb, Mo, W, Ag, Sn, Ge, Si, Al, and combinations thereof. The negative active material has high capacity and excellent cycle-life characteristics, and particularly, can provide a rechargeable lithium battery having high capacity at high-rate charge and discharge.

10 Claims, 8 Drawing Sheets

FOREIGN PATENT DOCUMENTS

| | | |
|---|---|---|
| JP | 2002-216753 | 8/2002 |
| JP | 2006286599 A | 10/2006 |
| KR | 10-2005-0052268 | 6/2005 |
| KR | 10-0570648 | 4/2006 |
| KR | 10-0570649 | 4/2006 |

OTHER PUBLICATIONS

Ohzuku, et al., "Zero-Strain Insertion Material of $Li[Li_{1/3}Ti_{5/3}]O_4$ for Rechargeable Lithium Cells", *Journal of the Electrochemical Society, Electrochemical Society*. vol. 142, No. 5, May 1, 1995.

Mi, et al., "Carbon-Coated $Li_{1.2}Cr_{0.4}Ti_{0.4}O_2$ Cathode Material for Lithium-Ion Batteries", *Electrochemical and Solid-State Letters*, vol. 9, No. 7, May 4, 2006, p. A324-A327.

Hiroshi Yamamoto et al., "Anode Properties of Li1+xV1-xO2 for Lithium Secondary Batteries", Abstract of 3B05 of the 43rd Battery Symposium in Japan, pp. 332-333.

Chinese Office Action issued by SIPO, dated Nov. 12, 2010, corresponding to Chinese Patent Application No. 200710192826.2, together with Full English Translation.

Japanese Office Action issued by Japan Patent Office on Apr. 5, 2011. Corresponding to Japanese Application No. 2007-300209, and "Request for Entry of the Accompanying Office Action" attached herewith.

Chinese Office Action issued by SIPO, dated May 18, 2011, corresponding to Chinese Patent Application No. 2007101928261.2, together with full English translation.

\* cited by examiner

NEGATIVE ACTIVE MATERIAL FOR RECHARGEABLE LITHIUM BATTERY, METHOD OF PREPARING THE SAME, AND RECHARGEABLE LITHIUM BATTERY INCLUDING THE SAME

CROSS-REFERENCE TO RELATED APPLICATION AND CLAIM FOR PRIORITY

This application claims priority to and the benefit of Korean Patent Application No. 10-2006-0114535 filed in the Korean Intellectual Property Office on Nov. 20, 2006, the entire content of which is incorporated herein by reference.

BACKGROUND OF THE INVENTION (a) Field of the Invention

The present invention relates to a negative active material for a rechargeable lithium battery, a method of preparing the same, and a rechargeable lithium battery including the same.

(b) Description of the Related Art

A rechargeable lithium battery has recently drawn attention as a power source for small portable electronic devices. It uses an organic electrolyte and thereby has twice the discharge voltage of a conventional battery using an alkali aqueous solution, and accordingly has high energy density.

For a positive active material of a rechargeable lithium battery, lithium-transition element composite oxides being capable of intercalating lithium, such as $LiCoO_2$, $LiMn_2O_4$, $LiNiO_2$, $LiNi_{1-x}Co_xO_2$ (0<x<1), $LiMnO_2$, and so on, have been researched.

For a negative active material of a rechargeable lithium battery, various carbon-based materials such as artificial graphite, natural graphite, and hard carbon have been used, which can all intercalate and deintercalate lithium ions. Graphite of the carbon-based material increases discharge voltage and energy density for a battery because it has a low discharge potential of −0.2V compared to lithium. A battery using graphite as a negative active material has a high average discharge potential of 3.6V and excellent energy density. Furthermore, graphite is most comprehensively used among the aforementioned carbon-based materials since graphite guarantees a better cycle life for a battery due to its outstanding reversibility. However, a graphite active material has a low density and consequently a low capacity in terms of energy density per unit volume when using the graphite as a negative active material. Further, there are some dangers, such as explosion or combustion, when a battery is misused, overcharged, or the like, because graphite is likely to react with an organic electrolyte at a high discharge voltage.

In order to solve these problems, a great deal of research on an oxide negative electrode has recently been performed. For example, amorphous tin oxide developed by Japan Fuji Film Co., Ltd. has a high capacity per weight (800 mAh/g). However, this oxide has resulted in some critical defects such as a high initial irreversible capacity of up to 50%. Furthermore, part of the tin oxide has tended to be reduced into tin during the charge or discharge reaction, which is a disadvantage for use in a battery.

Referring to another oxide negative electrode, a negative active material of $Li_aMg_bVO_c$ (0.05≦a≦3, 0.12≦b≦2, 2≦2c−a−2b≦5) is disclosed in Japanese Patent Publication No. 2002-216753. The characteristics of a lithium secondary battery including $Li_{1.1}V_{0.9}O_2$ were also presented in the 2002 Japanese Battery Conference (Preview No. 3B05).

However, such an oxide negative electrode does not show sufficient battery performance and therefore there has been a great deal of further research into oxide negative materials.

SUMMARY OF THE INVENTION

One embodiment of the present invention provides a negative active material for a rechargeable lithium battery that shows high capacity and excellent cycle-life characteristics.

Another embodiment of the present invention provides a method of preparing the negative active material.

Yet another embodiment of the present invention provides a rechargeable lithium battery including the negative active material.

According to an embodiment of the present invention, provided is a negative active material for a rechargeable lithium battery including a compound represented by the following Formula 1.

$$Li_{1+x}Ti_{1-x-y}M_yO_{2+z} \quad \text{[Chemical Formula 1]}$$

Wherein, in the above Formula 1, 0.01≦x≦0.5, 0≦y≦0.3, −0.2≦z≦0.2, and M is an element selected from the group consisting of V, Cr, Mn, Fe, Co, Ni, Cu, Zn, Zr, Nb, Mo, W, Ag, Sn, Ge, Si, Al, and combinations thereof.

According to one embodiment, 0.05≦x≦0.2, 0≦y≦0.2, −0.1≦z≦0.1, and M is an element selected from the group consisting of V, Mo, Fe, Cr, and combinations thereof.

The negative active material has a c/a lattice constant ratio of 2.5 to 7.0 (a and c refer to lattice constant which means a distance between axes) before intercalation of lithium (R-3m). According to one embodiment, the negative active material has a c/a lattice constant ratio of 0.3 to 3.0 after intercalation of lithium.

The negative active material has a change in a volume of the crystalline lattice of 30% or less by intercalation/deintercalation of lithium.

The negative active material undergoes oxidation and reduction reactions so that an average oxidation number of Ti in the negative active material has 2 to 4 by intercalation/deintercalation of lithium.

The negative active material has a redox potential of less than or equal to 1 V against a lithium metal.

The negative active material has a I(003)/I(104) intensity ratio ranging from 0.3 to 3, where I(003) is an intensity at a (003) plane and I(104) is an intensity at a (104) plane in an X-ray diffraction peak.

According to another embodiment of the present invention, provided is a method of preparing a negative active material for a rechargeable lithium battery that includes mixing a lithium source material, a Ti source material, and an M source material to prepare a solid-phase mixture; and subjecting the mixture to heat-treatment under a reduction atmosphere, or inert atmosphere to prepare a compound of the above Formula 1.

The lithium source material includes a lithium-containing water-soluble compound that is selected from the group consisting of lithium carbonate, lithium hydroxide, lithium nitrate, lithium acetate, and mixtures thereof.

The Ti source material includes at least one selected from the group consisting of Ti, Ti-containing oxide, Ti-containing hydroxide, and mixtures thereof.

The M source material includes at least one selected from the group consisting of a metal selected from the group consisting of V, Cr, Mn, Fe, Co, Ni, Cu, Zn, Zr, Nb, Mo, W, Ag, Sn, Ge, Si, Al, and combinations thereof; an oxide including the metal; an hydroxide including the metal; and mixtures thereof.

The reduction atmosphere or inert atmosphere may be at least one selected from the group consisting of a hydrogen atmosphere, a nitrogen atmosphere, an argon atmosphere, a $N_2/H_2$ mixed gas atmosphere, a $CO/CO_2$ mixed gas atmosphere, a helium atmosphere, and combinations thereof.

The heat-treatment may be performed at 500 to 1400° C.

According to another embodiment of the present invention, provided is a rechargeable lithium battery that includes a positive electrode including a positive active material being capable of intercalating and deintercalating lithium ions, a negative electrode including the negative active material of the above Formula 1, and a non-aqueous electrolyte.

The positive active material is at least one selected from the group consisting of compounds represented by the following Formulae 2 to 25.

$$Li_aA'_{1-b}B'_bD'_2 \qquad \text{[Chemical Formula 2]}$$

Wherein, in the above Formula 2, $0.95 \leq a \leq 1.1$, and $0 \leq b \leq 0.5$.

$$Li_aE'_{1-b}B'_bO_{2-c}F'_c \qquad \text{[Chemical Formula 3]}$$

Wherein, in the above Formula 3, $0.95 \leq a \leq 1.1$, $0 \leq b \leq 0.5$, and $0 \leq c \leq 0.05$.

$$LiE'_{2-b}B'_bO_{4-c}F'_c \qquad \text{[Chemical Formula 4]}$$

Wherein, in the above Formula 4, $0 \leq b \leq 0.5$, and $0 \leq c \leq 0.05$.

$$Li_aNi_{1-b-c}Co_bB'_cD'_\alpha \qquad \text{[Chemical Formula 5]}$$

Wherein, in the above Formula 5, $0.95 \leq a \leq 1.1$, $0 \leq b \leq 0.5$, $0 \leq c \leq 0.05$, and $0 < \alpha \leq 2$.

$$Li_aNi_{1-b-c}Co_bB'_cO_{2-\alpha}F'_\alpha \qquad \text{[Chemical Formula 6]}$$

Wherein, in the above Formula 6, $0.95 \leq a \leq 1.1$, $0 \leq b \leq 0.5$, $0 \leq c \leq 0.05$, and $0 < \alpha < 2$.

$$Li_aNi_{1-b-c}Co_bB'_cO_{2-\alpha}F'_2 \qquad \text{[Chemical Formula 7]}$$

Wherein, in the above Formula 7, $0.95 \leq a \leq 1.1$, $0 \leq b \leq 0.5$, $0 \leq c \leq 0.05$, and $0 < \alpha < 2$.

$$Li_aNi_{1-b-c}Mn_bB'_cD'_\alpha \qquad \text{[Chemical Formula 8]}$$

Wherein, in the above Formula 8, $0.95 \leq a \leq 1.1$, $0 \leq b \leq 0.5$, $0 \leq c \leq 0.05$, and $0 < \alpha \leq 2$.

$$Li_aNi_{1-b-c}Mn_bB'_cO_{2-\alpha}F'_\alpha \qquad \text{[Chemical Formula 9]}$$

Wherein, in the above Formula 9, $0.95 \leq a \leq 1.1$, $0 \leq b \leq 0.5$, $0 \leq c \leq 0.05$, and $0 < \alpha < 2$.

$$Li_aNi_{1-b-c}Mn_bB'_cO_{2-\alpha}F'_2 \qquad \text{[Chemical Formula 10]}$$

Wherein, in the above Formula 10, $0.95 \leq a \leq 1.1$, $0 \leq b \leq 0.5$, $0 \leq c \leq 0.05$, and $0 < \alpha < 2$.

$$Li_aNi_bE'_cG'_dO_2 \qquad \text{[Chemical Formula 11]}$$

Wherein, in the above Formula 11, $0.90 \leq a \leq 1.1$, $0 \leq b \leq 0.9$, $0 \leq c \leq 0.5$, and $0.001 \leq d \leq 0.1$.

$$Li_aNi_bCo_cMn_dG'_eO_2 \qquad \text{[Chemical Formula 12]}$$

Wherein, in the above Formula 12, $0.90 \leq a \leq 1.1$, $0 \leq b \leq 0.9$, $0 \leq c \leq 0.5$, $0 \leq d \leq 0.5$, and $0.001 \leq e \leq 0.1$.

$$Li_aNiG'_bO_2 \qquad \text{[Chemical Formula 13]}$$

Wherein, in the above Formula 13, $0.90 \leq a \leq 1.1$, and $0.001 \leq b \leq 0.1$.

$$Li_aCoG'_bO_2 \qquad \text{[Chemical Formula 14]}$$

Wherein, in the above Formula 14, $0.90 \leq a \leq 1.1$, and $0.001 \leq b \leq 0.1$.

$$Li_aMnG'_bO_2 \qquad \text{[Chemical Formula 15]}$$

Wherein, in the above Formula 15, $0.90 \leq a \leq 1.1$, and $0.001 \leq b \leq 0.1$.

$$Li_aMn_2G'_bO_4 \qquad \text{[Chemical Formula 16]}$$

Wherein, in the above Formula 16, $0.90 \leq a \leq 1.1$, and $0.001 \leq b \leq 0.1$.

$$Q'O_2 \qquad \text{[Chemical Formula 17]}$$

$$Q'S_2 \qquad \text{[Chemical Formula 18]}$$

$$LiQ'S_2 \qquad \text{[Chemical Formula 19]}$$

$$V_2O_5 \qquad \text{[Chemical Formula 20]}$$

$$LiV_2O_5 \qquad \text{[Chemical Formula 21]}$$

$$LiIO_2 \qquad \text{[Chemical Formula 22]}$$

$$LiNiVO_4 \qquad \text{[Chemical Formula 23]}$$

$$Li_{3-f}J'_2(PO_4)_3 (0 \leq f \leq 3) \qquad \text{[Chemical Formula 24]}$$

$$Li_{3-f}Fe_2(PO_4)_3 (0 \leq f \leq 2) \qquad \text{[Chemical Formula 25]}$$

In the above Formulae 2 to 25, A' is selected from the group consisting of Ni, Co, Mn, and combinations thereof; B' is selected from the group consisting of Al, Ni, Co, Mn, Cr, Fe, Mg, Sr, V, a rare earth element, and combinations thereof; D' is selected from the group consisting of O, F, S, P, and combinations thereof; E' is selected from the group consisting of Co, Mn, and combinations thereof; F' is selected from the group consisting of F, S, P, and combinations thereof; G' is selected from the group consisting of Al, Cr, Mn, Fe, Mg, La, Ce, Sr, V, and combinations thereof; Q' is selected from the group consisting of Ti, Mo, Mn, and combinations thereof; I' is selected from the group consisting of Cr, V, Fe, Sc, Y, and combinations thereof; and J' is selected from the group consisting of V, Cr, Mn, Co, Ni, Cu, and combinations thereof.

The electrolyte includes at least one non-aqueous organic solvent such as an organic solvent selected from the group consisting of a carbonate-based solvent, an ester-based solvent, an ether-based solvent, a ketone-based solvent, an alcohol-based solvent, an aprotic solvent, and combinations thereof.

Non-limiting examples of the lithium salt include at least one supporting electrolyte salt selected from the group consisting of $LiPF_6$, $LiBF_4$, $LiSbF_6$, $LiAsF_6$, $LiClO_4$, $LiCF_3SO_3$, $LiC_4F_9SO_3$, $LiN(CF_3SO_2)_2$, $LiN(C_2F_5SO_2)_2$, $LiAlO_2$, $LiAlCl_4$, $LiN(C_pF_{2p+1}SO_2)(C_qF_{2q+1}SO_2)$ (where p and q are natural numbers), LiCl, LiI, and combinations thereof.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components.

DETAILED DESCRIPTION OF THE EMBODIMENTS

For a negative active material for a rechargeable lithium battery, lithium metal oxides have been researched. In particular, lithium-transition metal oxides have a spinel and layered network structure where intercalation/deintercalation of lithium ions is smoothly carried out. Therefore, they are used for an effective negative active material.

According to one embodiment of the present invention, Co of lithium-transition metal oxides such as $LiCoO_2$ is substituted by Ti and M (hereinafter referred to as "second metal element") to prepare a lithium-metal oxide for a negative active material being easily capable of intercalating and deintercalating lithium ions.

The negative active material for a rechargeable lithium battery according to an embodiment of the present invention has higher energy density per volume than a conventional graphite active material, and further, shows less volume change than conventional metal or alloy-based active materials during intercalation/deintercalation of lithium ions. The negative active material according to an embodiment of the present invention is represented by the following Formula 1.

[Chemical Formula 1]

Wherein, in the above Formula 1, $0.01 \leq x \leq 0.5$, $0 \leq y \leq 0.3$, $-0.2 \leq z \leq 0.2$, and M is an element selected from the group consisting of V, Cr, Mn, Fe, Co, Ni, Cu, Zn, Zr, Nb, Mo, W, Ag, Sn, Ge, Si, Al, and combinations thereof. According to one embodiment, M is an element selected from the group consisting of V, Mo, Fe, Cr, and combinations thereof.

According to one embodiment, $0.05 \leq x \leq 0.2$, $0 \leq y \leq 0.2$, and $-0.1 \leq z \leq 0.1$ in the above Formula 1.

A positive active material such as $LiCoO_2$ or $LiNiO_2$ having a R-3m structure has a rocking chair-type layered structure of oxygen, lithium, and a transition element, where a part of the lithium is intercalated and deintercalated. The R-3m structure refers to a layered structure which includes one layer alternated with lithium and oxygen, and another layer alternated with a transition element and oxygen.

Figure 1A:
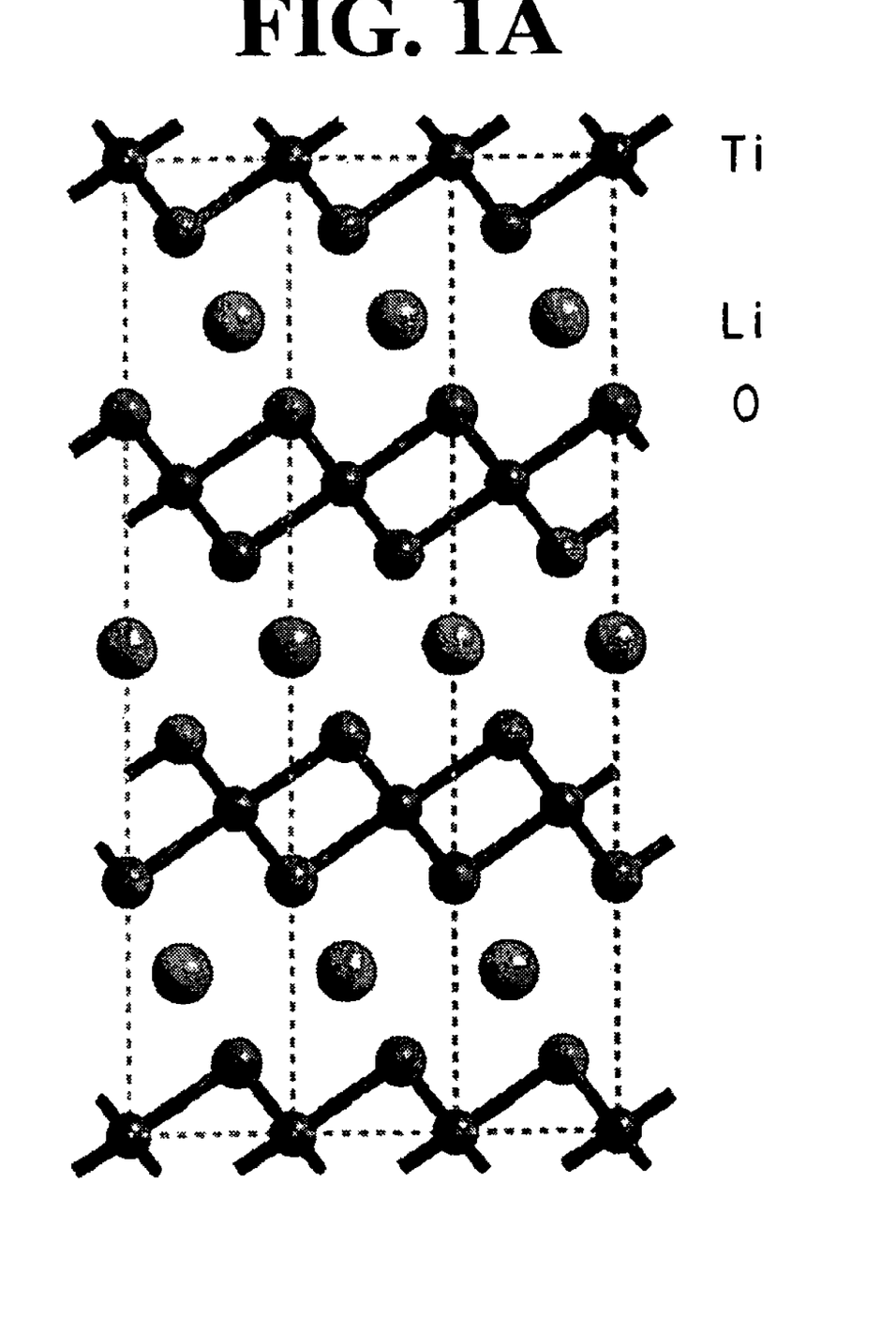
FIG. 1A schematically shows a structure of a $LiTiO_2$ negative active material.
Figure 1B:
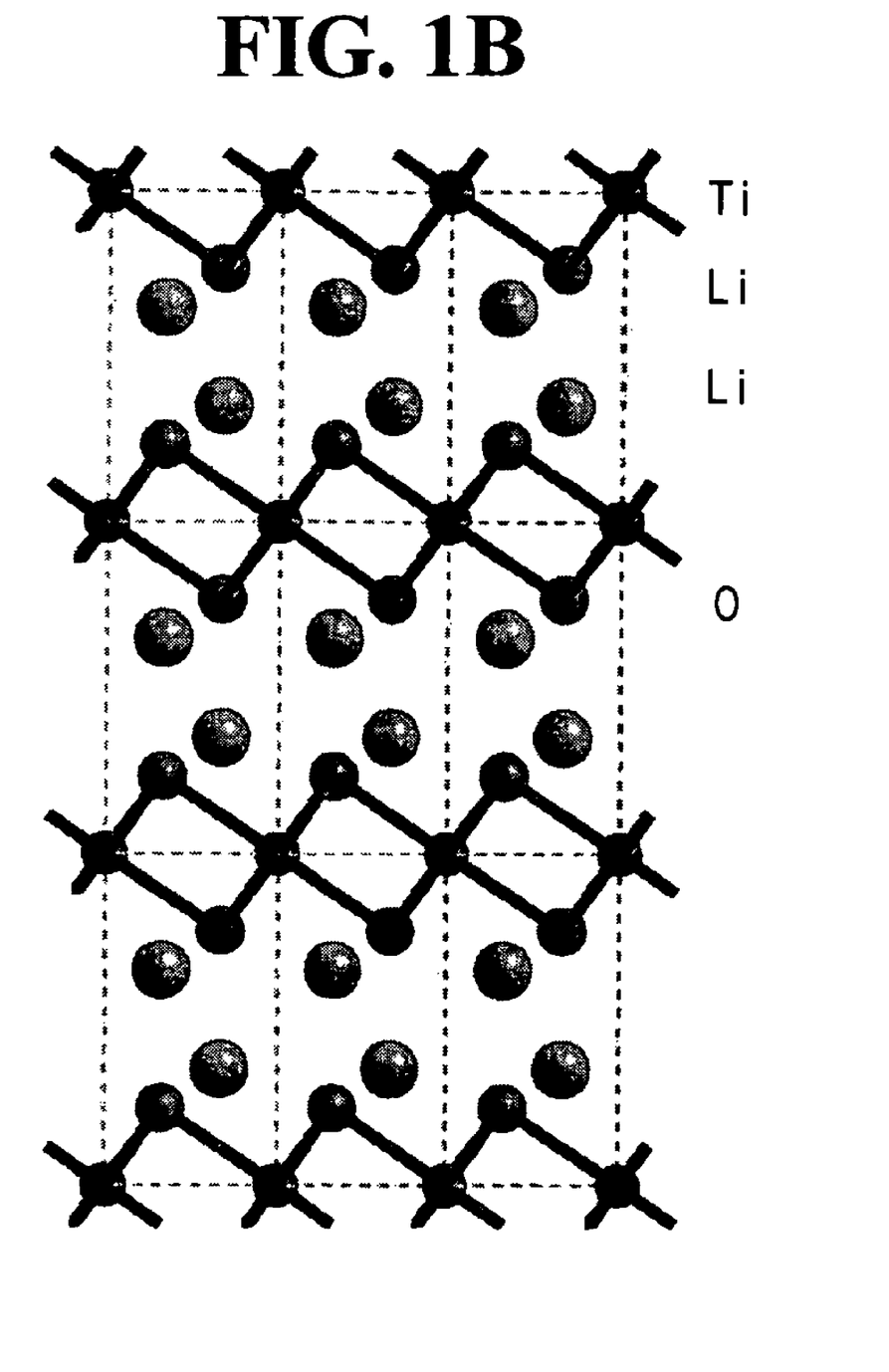
FIG. 1B is a schematic view showing change of a $LiTiO_2$ structure when 1 mole or more of lithium is intercalated.

For example, a $LiTiO_2$ structure is shown in FIG. 1A. 1 mole of lithium is intercalated in the $LiTiO_2$ structure and reversibly turns to a structure shown in FIG. 1B. Such a structural change has been also reported as in $LiNiO_2$. A part of the transition element, such as titanium (Ti) of $LiTiO_2$, is substituted by Li, and thereby an Li-rich compound is obtained.

The titanium element that can be substituted by Li exists between oxygen ions which are present in hexagonal closed packing sites, that is to say, an oxygen octahedral site, and the lithium exists as a single layer below the oxygen octahedral site. When lithium is intercalated to obtain $Li_{2.1}Ti_{0.9}O_2$, the lithium exists in a double-layer below the oxygen octahedral site. The $Li_{2.1}Ti_{0.9}O_2$ structure includes a titanium layer, which can be substituted by Li, an oxygen layer, and a lithium double-layer as shown in FIG. 1B, and then an oxygen layer and a titanium layer which also can be substituted by Li.

When a part of the titanium (Ti) is substituted by Li and a second metal such as V, Mo, Cr, Al, and so on, a reversible intercalation/deintercalation of lithium occurs as shown in FIGS. 1A and 1B.

According to one embodiment of the present invention, a part of titanium in the titanium layer is substituted by lithium and optionally a second metal (M) in order to facilitate smooth intercalation and deintercalation of lithium at a low potential so that a lattice constant (i.e., a distance between axes) increases. Accordingly, an interval between the lithium layers is widened as shown in FIG. 1B, and therefore intercalation/deintercalation of lithium is easily performed in a lithium intercalation crystalline structure. Such smooth intercalation/deintercalation of lithium increases the lithium diffusion rate during charge and discharge so that cycle-life and high-rate characteristics are improved.

According to the present invention, the negative active material according to an embodiment of the present invention of the composition of the above Formula 1 which is optimized, utilizing the above lattice structure change induces smooth intercalation/deintercalation of lithium at a low potential. During the electrochemical reaction, the compound of the above Formula 1 has an average oxidation number of Ti ranging from +2 to +4. The redox reaction occurs within a range of +2 to +4, which indicates a redox potential of less than or equal to 1 V against a lithium metal. According to one embodiment, the compound has a redox potential ranging from 0.01 to 1V. A conventional positive active material of vanadium oxide in a lithium ion battery has an oxidation number ranging from +3 to 4, or +4 to +5, its initial redox potential is over 2V against a lithium metal. On the contrary, the compound of the present invention has a redox potential of less than or equal to 1 V against a lithium metal, which makes the redox reactions perform at a significantly better potential. Accordingly, the compound of the above Formula 1 is expected to have a better cell discharge voltage when it is used as a negative active material.

In the compound of the above Formula 1, when x, y, and z are out of the stated ranges, or its structure is different from that described, the titanium has an oxidation number of +3 to +4 so that an average potential against a lithium metal is over 1.0V, which is significantly high and therefore decreases the discharge voltage of a battery since.

The negative active material has a c/a lattice constant ratio of 2.5 to 7.0 before intercalation of lithium (R-3m). According to one embodiment, the negative active material has a c/a lattice constant ratio of 3.5 to 7.0 before intercalation of lithium. When the c/a lattice constant ratio before intercalation of lithium is outside of the range of 2.5 to 7.0, intercalation and deintercalation of lithium ions is difficult, a potential at intercalation and deintercalation of lithium ions increases by 0.6V or more, and oxygen anions participate in the reactions to induce a hysteresis phenomenon where a potential difference between intercalation and deintercalation increases.

The negative active material has a c/a lattice constant ratio of 0.3 to 3.0 after intercalation of lithium (P-3 m1). According to one embodiment, the negative active material has a c/a lattice constant ratio of 1.0 to 3.0 after intercalation of lithium. When the ratio is less than 0.3, lithium diffusion is difficult since lattice change of intercalated lithium is small, whereas when it is more than 3.0, the crystalline structure is difficult to be maintained.

The negative active material has a change in a volume of the crystalline lattice of 30% or less by intercalation/deintercalation of lithium. According to one embodiment, the negative active material has a change in a volume of the crystalline lattice of over 0% to 27%. When the crystalline lattice volume change is more than 30%, electrode crack may occur due to volume change and so conductive paths may be interrupted, active materials may be detached from the electrode, internal resistance may increase, and capacity and cycle-life characteristics may be deteriorated due to segregation of adjacent particles.

The negative active material has an X-ray diffraction intensity ratio of the (003) plane to (104) plane (I(003)/I(104)) of 0.3 to 3, where I(003) is an intensity at a (003) plane and I(104) is an intensity at a (104) plane in an X-ray diffraction peak. According to one embodiment, the negative active material has a I(003)/I(104) intensity ratio ranging from 0.5 to 2. When the I(003)/I(104) intensity ratio is within the range of 0.3 to 3, an optimal layered compound can be produced, whereas when it is out of the range, a layered compound may not be produced.

The intensity of the X-ray diffraction peak is measured by X-ray diffraction analysis using a CuKα X ray (1.5418 Å, 40 kV/30 mA) within a 2θ range of 10 to 80° at a scanning rate of 0.02°/second.

Generally, a conventional carbon (graphite) active material is charged under constant current and constant voltage. However, when the recently researched active material such as a metal or metal/graphite composite for a high-capacity active material is charged under constant voltage, its structure may collapse by lithium intercalation, or the lithium cannot be diffused inside the crystalline structure, resulting in deposition of lithium on the surface of the active material due to a different mechanism of lithium intercalation/deintercalation. Therefore, reversibility and safety of the active material may be significantly deteriorated. Theses shortcomings make it difficult to use the metal or metal/graphite composite in a battery. However, the novel negative active material according to the present embodiment can be charged under a constant current/constant voltage to be applied to a battery.

The negative active material has a theoretical density per unit volume of 4.06 g/cc, and an actual density per unit volume of about 3.0 g/cc. When its capacity per unit weight is 308 mAh/g, a theoretical capacity per unit volume of over 1200 mAh/cc can be obtained, and actual capacity per unit volume of more than 900 mAh/cc can be obtained. On the contrary, a conventional graphite negative active material has a theoretical density per unit volume of 2.0 g/cc, and an actual density per unit volume of 1.6 g/cc, and when its capacity per unit weight is 360 mAh/g, an actual capacity per unit volume of 570 mAg/cc can be obtained. Therefore, the negative active material according to the present embodiment has an energy density that is twice the energy density of graphite.

The negative active material according to the present embodiment has more improved safety with respect to an organic electrolyte solution rather than a carbon-based negative active material.

The negative active material may be prepared by the method that includes preparing a solid-phase mixture by mixing a lithium source material, a Ti source material, and an M source material; and subjecting the mixture to heat-treatment under a reduction atmosphere.

Hereinafter, the method is described in more detail. First, the lithium source material, the Ti source material, and the M source material, as well as an optional additive, are mixed in a solid-phase to prepare a mixture.

The lithium source material, the Ti source material, and the M source material may be mixed in a predetermined ratio to obtain a compound having the Chemical Formula 1.

The lithium source material includes, but is not limited to, a lithium-containing water-soluble compound that is selected from the group consisting of lithium carbonate, lithium hydroxide, lithium nitrate, lithium acetate, and mixtures thereof.

The Ti source material includes, but is not limited to, at least one selected from the group consisting of Ti, a Ti-containing oxide, a Ti-containing hydroxide, and mixtures thereof. Specific examples of the Ti source material include Ti, $TiO_2$, and so on, but are not limited thereto.

The M source material includes, but is not limited to, at least one selected from the group consisting of a metal selected from the group consisting of V, Cr, Mn, Fe, Co, Ni, Cu, Zn, Zr, Nb, Mo, W, Ag, Sn, Ge, Si, Al, and combinations thereof; an oxide including the metal; an hydroxide including the metal; and mixtures thereof. Specific examples of the M source material include $Cr_2O_3$, $MoO_3$, $WO_3$, $ZrO_2$, $VO$, $V_2O_3$, $V_2O_4$, $V_2O_5$, $V_4O_7$, $VOSO_4 \cdot nH_2O$, or $NH_4VO_3$.

Subsequently, the solid-phase mixture is subjected to heat-treatment under a reduction atmosphere or a inert atmosphere to obtain a compound of the above Formula 1.

The heat-treatment may be performed at 500 to 1,400° C. According to one embodiment, the heat-treatment may be performed at 900 to 1,200° C. When the heat-treatment is performed at a temperature out of the range of 500 to 1,400° C., impurity phases may be generated and thereby capacity and cycle-life characteristics may be deteriorated.

The heat-treatment is performed under a reduction atmosphere. The reduction atmosphere or the inert atmosphere may be a hydrogen atmosphere, a nitrogen atmosphere, an argon atmosphere, a $N_2/H_2$ mixed gas atmosphere, a $CO/CO_2$ mixed gas atmosphere, a helium atmosphere, and combinations thereof. The oxygen partial pressure of the reduction atmosphere or the inert atmosphere may be less than $2 \times 10^{-1}$ atm. When the oxygen partial pressure in the reduction atmosphere or the inert atmosphere is $2 \times 10^{-1}$ atm or more, the atmosphere turns into an oxidation atmosphere so that oxidized metal oxide, the oxygen-rich phase, may be synthesized or other impurities having 2 or more oxygen may coexist.

The prepared negative active material represented by the above Formula 1 has excellent capacity per unit volume, and improved initial efficiency and cycle-life characteristics.

According to another embodiment of the present invention, a rechargeable lithium battery includes a negative electrode including the negative active material, a positive electrode including a positive active material, and an electrolyte.

Rechargeable lithium batteries may be classified as lithium ion batteries, lithium ion polymer batteries, and lithium polymer batteries according to the presence of a separator and the kind of electrolyte used in the battery. The rechargeable lithium batteries may have a variety of shapes and sizes, including cylindrical, prismatic, or coin-type batteries, and may be a thin film battery or be rather bulky in size. Structures and fabricating methods for lithium ion batteries pertaining to the present invention are well known in the art.

Figure 2:
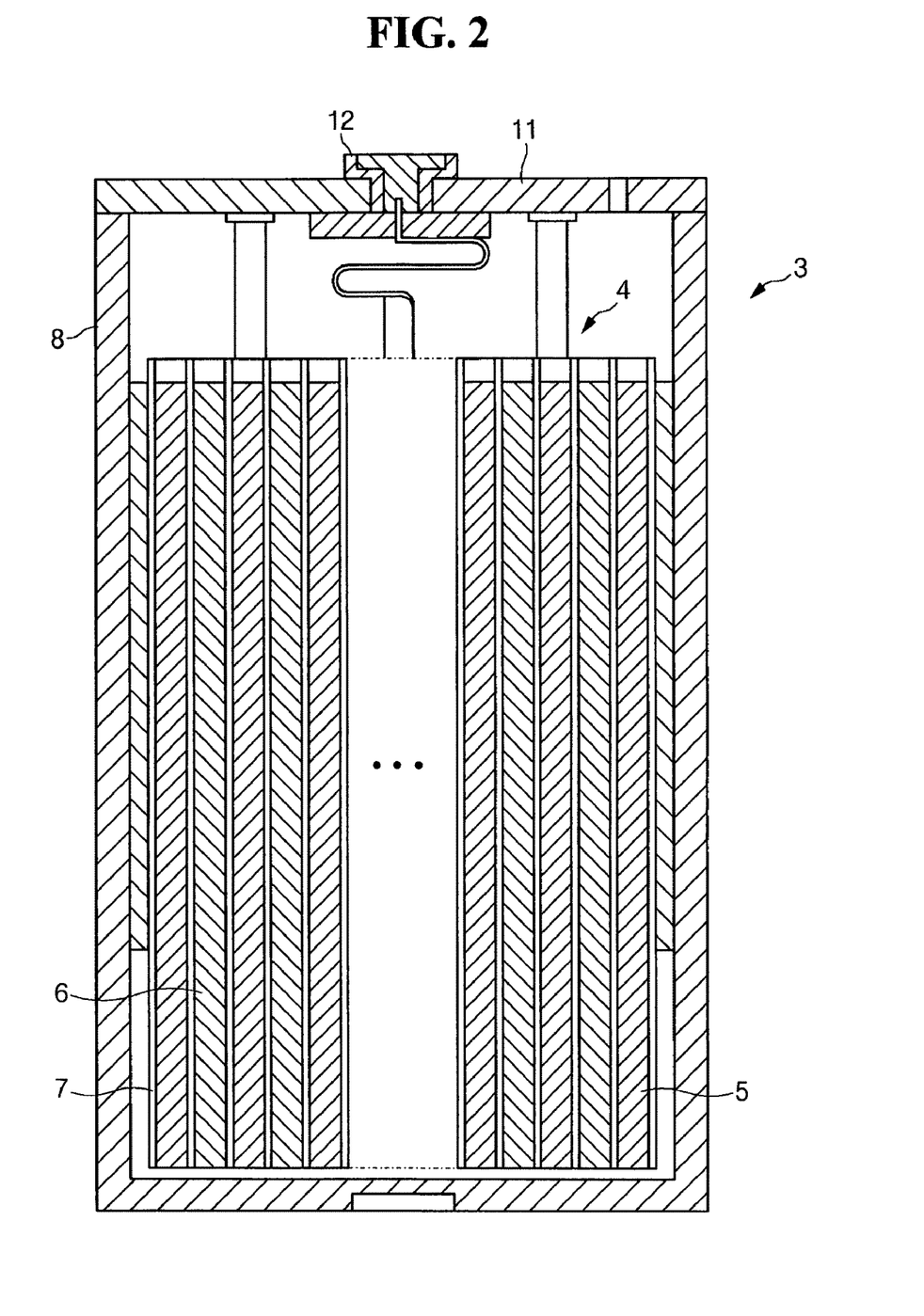
FIG. 2 is a schematic cross-sectional view of a rechargeable lithium battery according to one embodiment of the present invention.

FIG. 2 shows a structure of a rechargeable lithium battery according to one embodiment of the present invention.

Referring to FIG. 2, the rechargeable lithium battery 3 may be fabricated as follows: an electrode assembly 4 including a positive electrode 5, a negative electrode 6, and a separator 7 interposed between the positive electrode 5 and the negative electrode 6 is placed in a battery case 8; an electrolyte is provided through the opening of the battery case 8; and the battery case 8 is sealed with a cap plate 11 and a gasket 12.

The negative electrode 6 includes a current collector and a negative active material layer disposed on the current collector, and the negative active material layer includes a negative active material.

The negative active material is the same as above described and is included in an amount of 1 to 99 wt % based on the total weight of the negative active material layer. According to one embodiment, the negative active material can be included in an amount of 10 to 98 wt %. When the negative active material is included in an amount out of the range of 1 to 99 wt %, capacity may be deteriorated or the relative amount of a binder is reduced, thereby deteriorating the adherence between the negative active material layer and a current collector.

The negative electrode may be fabricated as follows. A negative active material composition is prepared by mixing the negative active material, a binder, and optionally a conductive agent, and then the composition is applied on a negative current collector such as copper. The negative electrode manufacturing method is well known, and thus is not described in detail in the present specification.

Examples of the binder include, but are not limited to, polyvinyl alcohol, carboxymethyl cellulose, hydroxypropyl cellulose, diacetyl cellulose, polyvinyl chloride, polyvinylpyrrolidone, polytetrafluoroethylene, polyvinylidene fluoride, polyethylene, and polypropylene.

Any electrically conductive material can be used as the conductive agent unless it causes a chemical change. Examples of the conductive agent include natural graphite, artificial graphite, carbon black, acetylene black, ketjen black, carbon fiber, a metal powder or a metal fiber including copper, nickel, aluminum, silver, and so on, or a polyphenylene derivative.

The solvent can be N-methylpyrrolidone, but it is not limited thereto.

The current collector may be selected from the group consisting of a copper foil, a nickel foil, a stainless steel foil, a titanium foil, a nickel foam, a copper foam, a polymer substrate coated with a conductive metal, and combinations thereof.

The positive electrode includes a positive active material that includes a lithiated intercalation compound being reversibly capable of intercalating and deintercalating lithium. The lithiated intercalation compound may include composite oxides including lithium and a metal selected from the group consisting of cobalt, manganese, nickel, molybdenum, titanium, and combinations thereof, and more specifically exemplified by compounds of the following Formulae 2 to 25.

$$Li_aA'_{1-b}B'_bD'_2 \qquad \text{[Chemical Formula 2]}$$

Wherein, in the above Formula 2, $0.95 \leq a \leq 1.1$, and $0 \leq b \leq 0.5$.

$$Li_aE'_{1-b}B'_bO_{2-c}F'_c \qquad \text{[Chemical Formula 3]}$$

Wherein, in the above Formula 3, $0.95 \leq a \leq 1.1$, $0 \leq b \leq 0.5$, and $0 \leq c \leq 0.05$.

$$LiE'_{2-b}B'_bO_{4-c}F'_c \qquad \text{[Chemical Formula 4]}$$

Wherein, in the above Formula 4, $0 \leq b \leq 0.5$, and $0 \leq c \leq 0.05$.

$$Li_aNi_{1-b-c}Co_bB'_cD'_\alpha \qquad \text{[Chemical Formula 5]}$$

Wherein, in the above Formula 5, $0.95 \leq a \leq 1.1$, $0 \leq b \leq 0.5$, $0 \leq c \leq 0.05$, and $0 < \alpha \leq 2$.

$$Li_aNi_{1-b-c}Co_bB'_cO_{2-\alpha}F'_\alpha \qquad \text{[Chemical Formula 6]}$$

Wherein, in the above Formula 6, $0.95 \leq a \leq 1.1$, $0 \leq b \leq 0.5$, $0 \leq c \leq 0.05$, and $0 < \alpha < 2$.

$$Li_aNi_{1-b-c}Co_bB'_cO_{2-\alpha}F'_2 \qquad \text{[Chemical Formula 7]}$$

Wherein, in the above Formula 7, $0.95 \leq a \leq 1.1$, $0 \leq b \leq 0.5$, $0 \leq c \leq 0.05$, and $0 < \alpha < 2$.

$$Li_aNi_{1-b-c}Mn_bB'_cD'_\alpha \qquad \text{[Chemical Formula 8]}$$

Wherein, in the above Formula 8, $0.95 \leq a \leq 1.1$, $0 \leq b \leq 0.5$, $0 \leq c \leq 0.05$, and $0 < \alpha \leq 2$.

$$Li_aNi_{1-b-c}Mn_bB'_cO_{2-\alpha}F'_\alpha \qquad \text{[Chemical Formula 9]}$$

Wherein, in the above Formula 9, $0.95 \leq a \leq 1.1$, $0 \leq b \leq 0.5$, $0 \leq c \leq 0.05$, and $0 < \alpha < 2$.

$$Li_aNi_{1-b-c}Mn_bB'_cO_{2-\alpha}F'_2 \qquad \text{[Chemical Formula 10]}$$

Wherein, in the above Formula 10, $0.95 \leq a \leq 1.1$, $0 \leq b \leq 0.5$, $0 \leq c \leq 0.05$, and $0 < \alpha < 2$.

$$Li_aNi_bE'_cG'_dO_2 \qquad \text{[Chemical Formula 11]}$$

Wherein, in the above Formula 11, $0.90 \leq a \leq 1.1$, $0 \leq b \leq 0.9$, $0 \leq c \leq 0.5$, and $0.001 \leq d \leq 0.1$.

$$Li_aNi_bCo_cMn_dG'_eO_2 \qquad \text{[Chemical Formula 12]}$$

Wherein, in the above Formula 12, $0.90 \leq a \leq 1.1$, $0 \leq b \leq 0.9$, $0 \leq c \leq 0.5$, $0 \leq d \leq 0.5$, and $0.001 \leq e \leq 0.1$.

$$Li_aNiG'_bO_2 \qquad \text{[Chemical Formula 13]}$$

Wherein, in the above Formula 13, $0.90 \leq a \leq 1.1$, and $0.001 \leq b \leq 0.1$.

$$Li_aCoG'_bO_2 \qquad \text{[Chemical Formula 14]}$$

Wherein, in the above Formula 14, $0.90 \leq a \leq 1.1$, and $0.001 \leq b \leq 0.1$.

$$Li_aMnG'_bO_2 \qquad \text{[Chemical Formula 15]}$$

Wherein, in the above Formula 15, $0.90 \leq a \leq 1.1$, and $0.001 \leq b \leq 0.1$.

$$Li_aMn_2G'_bO_4 \qquad \text{[Chemical Formula 16]}$$

Wherein, in the above Formula 16, $0.90 \leq a \leq 1.1$, and $0.001 \leq b \leq 0.1$.

$$Q'O_2 \qquad \text{[Chemical Formula 17]}$$

$$Q'S_2 \qquad \text{[Chemical Formula 18]}$$

$$LiQ'S_2 \qquad \text{[Chemical Formula 19]}$$

$$V_2O_5 \qquad \text{[Chemical Formula 20]}$$

$$LiV_2O_5 \qquad \text{[Chemical Formula 21]}$$

$$LiI'O_2 \qquad \text{[Chemical Formula 22]}$$

$$LiNiVO_4 \qquad \text{[Chemical Formula 23]}$$

$$Li_{3-f}J'_2(PO_4)_3 (0 \leq f \leq 3) \qquad \text{[Chemical Formula 24]}$$

$$Li_{3-f}Fe_2(PO_4)_3 (0 \leq f \leq 2) \qquad \text{[Chemical Formula 25]}$$

In the above Formulae 2 to 25, A' is selected from the group consisting of Ni, Co, Mn, and combinations thereof; B' is selected from the group consisting of Al, Ni, Co, Mn, Cr, Fe, Mg, Sr, V, a rare earth element, and combinations thereof; D' is selected from the group consisting of O, F, S, P, and combinations thereof; E' is selected from the group consisting of Co, Mn, and combinations thereof; F' is selected from the group consisting of F, S, P, and combinations thereof; G' is selected from the group consisting of Al, Cr, Mn, Fe, Mg, La, Ce, Sr, V, lanthanide, and combinations thereof; Q' is selected from the group consisting of Ti, Mo, Mn, and combinations thereof; I' is selected from the group consisting of Cr, V, Fe, Sc, Y, and combinations thereof; and J' is selected from the group consisting of V, Cr, Mn, Co, Ni, Cu, and combinations thereof.

Alternatively, the positive active material may be at least one selected from the group consisting of elemental sulfur ($S_8$), and a sulfur-based compound such as $Li_2S_n$ (n≧1), $Li_2S_n$ (n≧1) dissolved in a catholyte, an organic sulfur compound, or a carbon-sulfur polymer (($C_2S_f)_n$: f=2.5 to 50, n≧2).

The positive electrode may be fabricated according to the same method as for the above negative electrode, as follows: a positive active material composition is prepared by mixing the positive active material, a binder, and optionally a conductive agent, and then the positive active material composition is applied on a positive current collector such as aluminum.

An electrolyte included in the rechargeable lithium battery may be a non-aqueous electrolyte or a solid electrolyte.

The non-aqueous electrolyte is a lithium salt dissolved in a non-aqueous organic solvent. The lithium salt acts as a lithium-ion source, helping the basic battery operation. Non-limiting examples of the lithium salt include at least one supporting electrolyte salt selected from the group consisting of $LiPF_6$, $LiBF_4$, $LiSbF_6$, $LiAsF_6$, $LiClO_4$, $LiCF_3SO_3$, $LiC_4F_9SO_3$, $LiN(CF_3SO_2)_2$, $LiN(C_2F_5SO_2)_2$, $LiAlO_2$, $LiAlCl_4$, $LiN(C_pF_{2p+1}SO_2)(C_qF_{2q+1}SO_2)$ (where p and q are natural numbers), LiCl, LiI, lithium bisoxalate borate, and combinations thereof.

The lithium salt may be used at 0.6 to 2.0M concentration. According to one embodiment, the lithium salt may be used at 0.7 to 1.6 M concentration. When the lithium salt concentration is less than 0.6M, electrolyte performance may be deteriorated due to low electrolyte conductivity, whereas when it is more than 2.0M, lithium ion mobility may be reduced due to an increase of electrolyte viscosity.

The non-aqueous organic solvent acts as a medium for transmitting ions taking part in the electrochemical reaction of the battery. The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and so on. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and so on. Examples of the ether-based solvent include dibutyl ether, tetraglyme, diglyme, dimethoxyethane, 2-methyltetrahydrofuran, tetrahydrofuran, and so on, and examples of the ketone-based solvent include cyclohexanone, and so on. Examples of the alcohol-based solvent include ethyl alcohol, isopropyl alcohol, and so on, and examples of the aprotic solvent include a nitrile such as R—CN (wherein, R is a C2 to C20 linear, branched, or cyclic hydrocarbon, a double bond, an aromatic ring, or an ether bond), an amide such as dimethylformamide, a dioxolane such as 1,3-dioxolane, a sulfolane, and so on.

The non-aqueous organic solvent may be used singularly or in a mixture. When the organic solvent is used in a mixture, a mixture ratio can be controlled in accordance with a desirable battery performance.

The carbonate-based solvent may include a mixture of a cyclic carbonate and a chain carbonate. The cyclic carbonate and the chain carbonate are mixed together in a volume ratio of 1:1 to 1:9, and when the mixture is used as an electrolyte, the electrolyte performance may be enhanced.

In addition, the electrolyte of the present invention may further include mixtures of carbonate-based solvents and aromatic hydrocarbon-based solvents. The carbonate-based solvents and the aromatic hydrocarbon-based solvents are preferably mixed together in a volume ratio of 1:1 to 30:1.

The aromatic hydrocarbon-based organic solvent may be represented by the following Formula 26.

[Chemical Formula 26]

Wherein, $R_1$ to $R_6$ are independently selected from the group consisting of hydrogen, a halogen, a C1 to C10 alkyl, a C1 to C10 haloalkyl, and combinations thereof.

The aromatic hydrocarbon-based organic solvent may include, but is not limited to, at least one selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The non-aqueous electrolyte may further include an overcharge inhibition additive such as pyrocarbonate, and so on.

Examples of the solid electrolyte include, but are limited to, a polyethylene oxide polymer electrolyte, or a polymer electrolyte including at least one polyorganosiloxane side chain or polyoxyalkylene side chain, or a sulfide electrolyte such as $Li_2S$—$SiS_2$, $Li_2S$—$GeS_2$, $Li_2S$—$P_2S_5$, or $Li_2S$—$B_2S_3$, or an inorganic electrolyte such as $Li_2S$—$SiS_2$—$Li_3PO_4$, or $Li_2S$—$SiS_2$—$Li_3SO_4$.

The rechargeable lithium battery generally includes a positive electrode, a negative electrode, and an electrolyte. The battery may further include a separator as needed. The separator may include any material used in conventional lithium secondary batteries. Non-limiting examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, or a polypropylene/polyethylene/polypropylene triple-layered separator.

The following examples illustrate the present invention in more detail. These examples, however, should not in any sense be interpreted as limiting the scope of the present invention.

Example 1

$Li_2CO_3$ and $TiO_2$ were mixed in a solid-phase so that a mole ratio of Li:Ti was 1.1:0.9. The mixture was heat-treated at 1100° C. under a nitrogen atmosphere and cooled to room temperature to prepare a $Li_{1.1}Ti_{0.9}O_2$ negative active material for a rechargeable lithium battery. The prepared negative active material showed a single-phase diffraction pattern including an R-3M crystalline structure.

Example 2

$Li_2CO_3$, $TiO_2$, and $V_2O_4$ were mixed in a solid-phase so that a mole ratio of Li:Ti:V was 1.1:0.89:0.01. The mixture was heat-treated at 1100° C. under a nitrogen atmosphere to prepare a $Li_{1.1}Ti_{0.89}V_{0.01}O_2$ negative active material for a rechargeable lithium battery cell. The prepared negative active material showed a single-phase diffraction pattern including an R-3M crystalline structure.

Example 3

$Li_2CO_3$, $TiO_2$, and $Cr_2O_3$ were mixed in a solid-phase so that a mole ratio of Li:Ti:Cr was 1.1:0.89:0.01. The mixture was heat-treated at 1100° C. under a nitrogen atmosphere to prepare a $Li_{1.1}Ti_{0.89}Cr_{0.01}O_2$ negative active material for a rechargeable lithium battery. The prepared negative active material showed a single-phase diffraction pattern including an R-3M crystalline structure.

Example 4

$Li_2CO_3$, $TiO_2$, and $MnO_2$ were mixed in a solid-phase so that a mole ratio of Li:Ti:Mn was 1.1:0.89:0.01. The mixture was heat-treated at 1100° C. under a nitrogen atmosphere to prepare a $Li_{1.1}Ti_{0.89}Mn_{0.01}O_2$ negative active material for a rechargeable lithium battery. The prepared negative active material showed a single-phase diffraction pattern including an R-3M crystalline structure.

Example 5

$Li_2CO_3$, $TiO_2$, and $Fe_2O_3$ were mixed in a solid-phase so that with a mole ratio of Li:Ti:Fe was 1.1:0.89:0.01. The mixture was heat-treated at 1100° C. under a nitrogen atmosphere to prepare a $Li_{1.1}Ti_{0.89}Fe_{0.01}O_2$ negative active material for a rechargeable lithium battery. The prepared negative active material showed a single-phase diffraction pattern including an R-3M crystalline structure.

Example 6

$Li_2CO_3$, $TiO_2$, and $Co_2O_3$ were mixed in a solid-phase so that a mole ratio of Li:Ti:Co was 1.1:0.89:0.01. The mixture was heat-treated at 1100° C. under a nitrogen atmosphere to prepare a $Li_{1.1}Ti_{0.89}Co_{0.01}O_2$ negative active material for a rechargeable lithium battery. The prepared negative active material showed a single-phase diffraction pattern including an R-3M crystalline structure.

Example 7

$Li_2CO_3$, $TiO_2$, and $NiO_2$ were mixed in a solid-phase so that a mole ratio of Li:Ti:Ni was 1.1:0.89:0.01. The mixture was heat-treated at 1100° C. under a nitrogen atmosphere to prepare a $Li_{1.1}Ti_{0.89}Ni_{0.01}O_2$ negative active material for a rechargeable lithium battery. The prepared negative active material showed a single-phase diffraction pattern including an R-3M crystalline structure.

Example 8

$Li_2CO_3$, $TiO_2$, and CuO were mixed in a solid-phase so that a mole ratio of Li:Ti:Cu was 1.1:0.89:0.01. The mixture was heat-treated at 1100° C. under a nitrogen atmosphere to prepare a $Li_{1.1}Ti_{0.89}Cu_{0.01}O_2$ negative active material for a rechargeable lithium battery. The prepared negative active material showed a single-phase diffraction pattern including an R-3M crystalline structure.

Example 9

$Li_2CO_3$, $TiO_2$, and $ZnCO_3$ were mixed in a solid-phase so that a mole ratio of Li:Ti:Zn was 1.1:0.89:0.01. The mixture was heat-treated at 1100° C. under a nitrogen atmosphere to prepare a $Li_{1.1}Ti_{0.89}Zn_{0.01}O_2$ negative active material for a rechargeable lithium battery. The prepared negative active material showed a single-phase diffraction pattern including an R-3M crystalline structure.

Example 10

$Li_2CO_3$, $TiO_2$, and $ZrO_2$ were mixed in a solid-phase so that a mole ratio of Li:Ti:Zr was 1.1:0.89:0.01. The mixture was heat-treated at 1100° C. under a nitrogen atmosphere to prepare a $Li_{1.1}Ti_{0.89}Zr_{0.01}O_2$ negative active material for a rechargeable lithium battery. The prepared negative active material showed a single-phase diffraction pattern including an R-3M crystalline structure.

Example 11

$Li_2CO_3$, $TiO_2$, and $Nb_2O_3$ were mixed in a solid-phase so that a mole ratio of Li:Ti:Nb was 1.1:0.89:0.01. The mixture was heat-treated at 1100° C. under a nitrogen atmosphere to prepare a $Li_{1.1}Ti_{0.89}Nb_{0.01}O_2$ negative active material for a rechargeable lithium battery. The prepared negative active material showed a single-phase diffraction pattern including an R-3M crystalline structure.

Example 12

$Li_2CO_3$, $TiO_2$, and $MoO_3$ were mixed in a solid-phase so that a mole ratio of Li:Ti:Mo was 1.1:0.89:0.01. The mixture was heat-treated at 1100° C. under a nitrogen atmosphere to prepare a $Li_{1.1}Ti_{0.89}Mo_{0.01}O_2$ negative active material for a rechargeable lithium battery. The prepared negative active material showed a single-phase diffraction pattern including an R-3M crystalline structure.

Example 13

$Li_2CO_3$, $TiO_2$, and $WO_3$ were mixed in a solid-phase so that a mole ratio of Li:Ti:W was 1.1:0.89:0.01. The mixture was heat-treated at 1100° C. under a nitrogen atmosphere to prepare a $Li_{1.1}Ti_{0.89}W_{0.01}O$ negative active material for a rechargeable lithium battery. The prepared negative active material showed a single-phase diffraction pattern including an R-3M crystalline structure.

Example 14

$Li_2CO_3$, $TiO_2$, and $Ag_2CO_3$ were mixed in a solid-phase so that a mole ratio of Li:Ti:Ag was 1.1:0.89:0.01. The mixture was heat-treated at 1100° C. under a nitrogen atmosphere to prepare a $Li_{1.1}Ti_{0.89}Ag_{0.01}O_2$ negative active material for a rechargeable lithium battery. The prepared negative active material showed a single-phase diffraction pattern including an R-3M crystalline structure.

Example 15

$Li_2CO_3$, $TiO_2$, and $SnO_2$ were mixed in a solid-phase so that a mole ratio of Li:Ti:Sn was 1.1:0.89:0.01. The mixture was heat-treated at 1100° C. under a nitrogen atmosphere to prepare a $Li_{1.1}Ti_{0.89}Sn_{0.01}O_2$ negative active material for a rechargeable lithium battery. The prepared negative active material showed a single-phase diffraction pattern including an R-3M crystalline structure.

Example 16

$Li_2CO_3$, $TiO_2$, and $GeO_2$ were mixed in a solid-phase so that a mole ratio of Li:Ti:Ge was 1.1:0.89:0.01. The mixture was heat-treated at 1100° C. under a nitrogen atmosphere to prepare a $Li_{1.1}Ti_{0.89}Ge_{0.01}O_2$ negative active material for a rechargeable lithium battery. The prepared negative active material showed a single-phase diffraction pattern including an R-3M crystalline structure.

Example 17

$Li_2CO_3$, $TiO_2$, and $SiO_2$ were mixed in a solid-phase so that a mole ratio of Li:Ti:Si was 1.1:0.89:0.01. The mixture was heat-treated at 1100° C. under a nitrogen atmosphere to prepare a $Li_{1.1}Ti_{0.89}Si_{0.01}O_2$ negative active material for a rechargeable lithium battery. The prepared negative active material showed a single-phase diffraction pattern including an R-3M crystalline structure.

Example 18

$Li_2CO_3$, $TiO_2$, and $Al_2O_3$ were mixed in a solid-phase so that a mole ratio of Li:Ti:Al was 1.1:0.89:0.01. The mixture was heat-treated at 1100° C. under a nitrogen atmosphere to prepare a $Li_{1.1}Ti_{0.89}Al_{0.01}O_2$ negative active material for a rechargeable lithium battery. The prepared negative active material showed a single-phase diffraction pattern including an R-3M crystalline structure.

Comparative Example 1

A $Li_{1.1}V_{0.9}O_2$ negative active material for a rechargeable lithium battery was prepared according to the same method as in Example 1 except for mixing $Li_2CO_3$ and $V_2O_4$ in a solid-phase so that a mole ratio of Li:V was 1.1:0.9.

Comparative Example 2

Graphite was used as the negative active material.

Structural Analysis of a Negative Active Material

The negative active materials according to the Example 1 and 2, and Comparative Example 1 were measured using X-ray diffraction (Philips X'pert X-ray Diff.).

The X-ray diffraction analysis was performed using a CuKα X ray (1.5418 Å, 40 kV/30 mA) within a 2θ range of 10 to 80° at a scanning rate of 0.02°/second.

Figure 3:
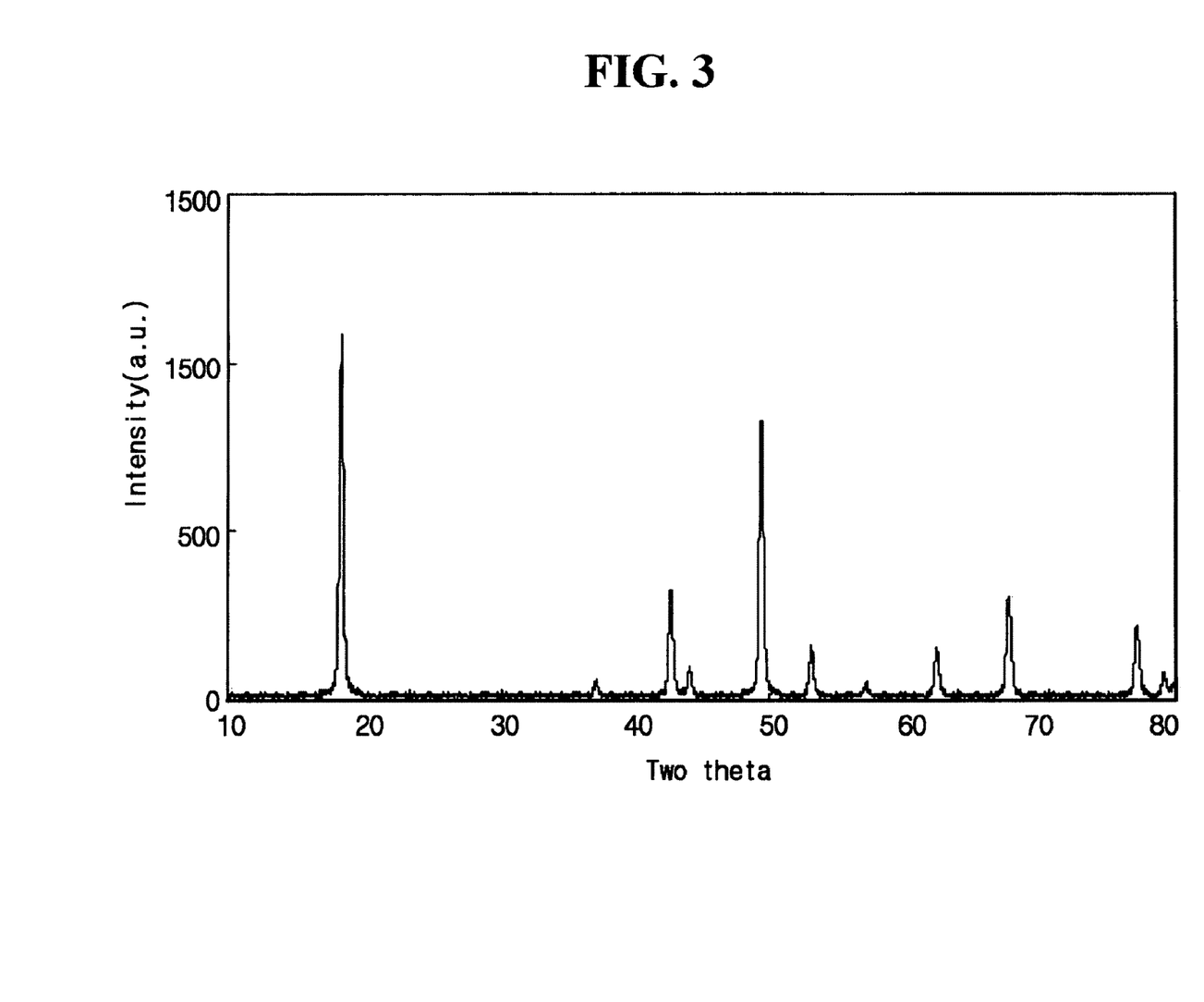
FIG. 3 is a graph showing an XRD measurement result of the negative active material according to Example 1.
Figure 4:
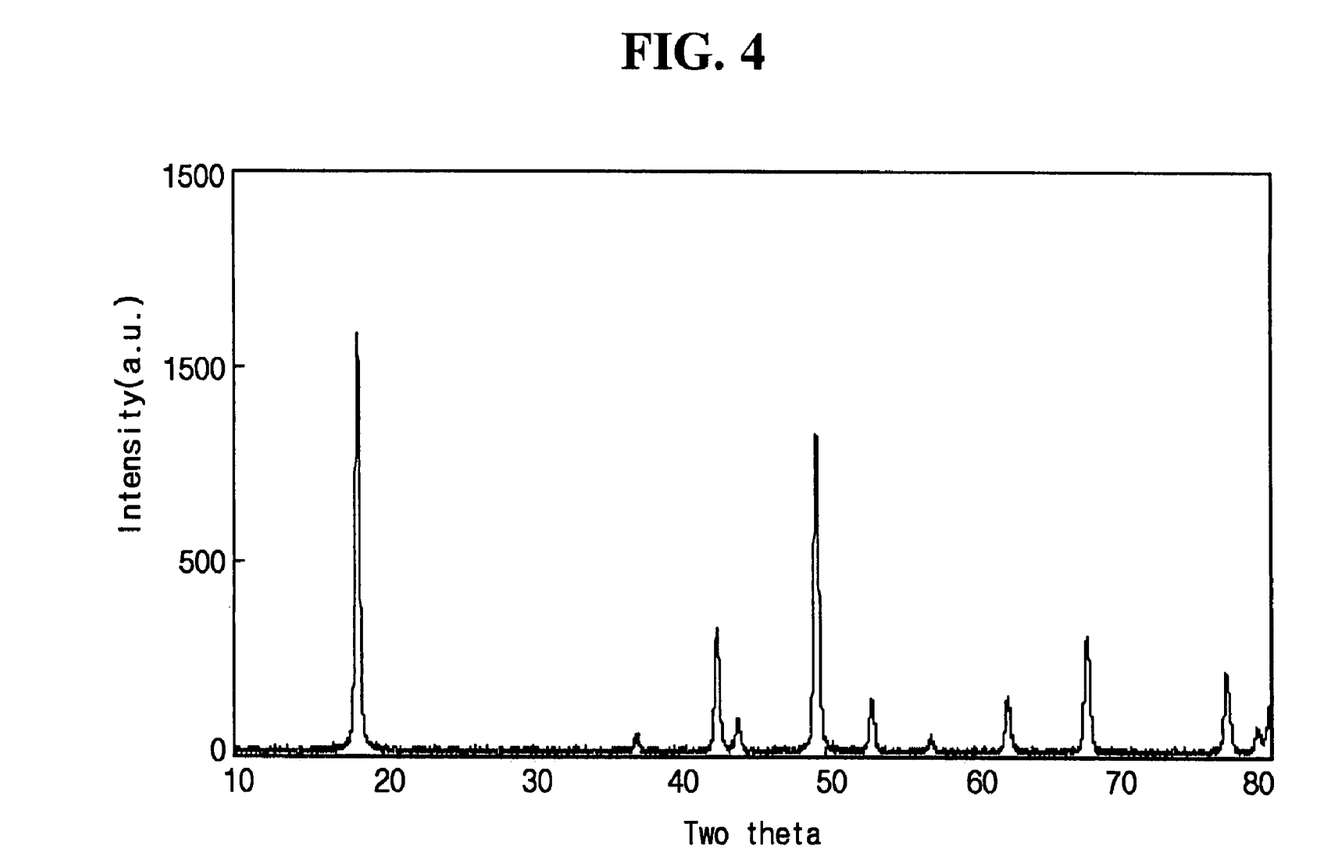
FIG. 4 is a graph showing an XRD measurement result of the negative active material according to Example 2.
Figure 5:
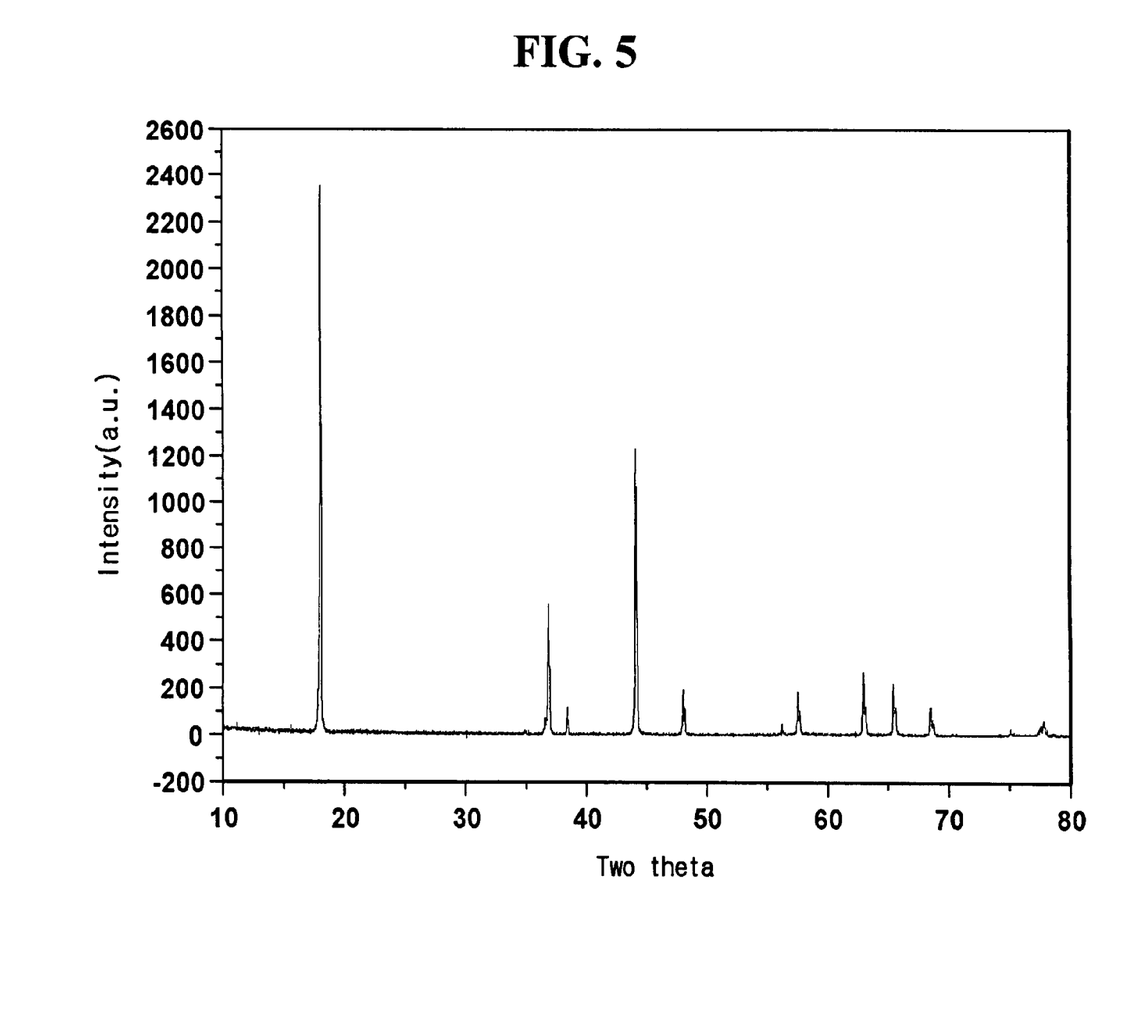
FIG. 5 is a graph showing an XRD measurement result of the negative active material according to Comparative Example 1.

FIGS. 3 to 5 respectively show XRD measurement results of the negative active materials according to Example 1 and 2 and Comparative Example 1.

As shown in FIGS. 3 to 5, the negative active material of Example 1 had a hexagonal crystal structure, a lattice constant a of 2.471 Å, a lattice constant c of 14.518 Å, and a c/a lattice constant ratio of 5.88. The negative active material of Example 2 had a single-phase diffraction pattern of a hexagonal crystal structure, including a lattice constant a 2.475 Å, a lattice constant c of 14.518 Å, and a c/a lattice constant ratio of 5.87. The negative active material of Comparative Example 1 had a single-phase diffraction pattern of a hexagonal crystal structure, including a lattice constant a of 2.853 Å, a lattice constant c of 14.698 Å, and a c/a lattice constant ratio of 5.15.

Estimation of Battery Characteristics

Negative electrodes including negative active materials prepared according to the Examples 1 and 2 and Comparative Examples 1 and 2 were measured regarding electrochemical characteristics (capacity and cycle-life characteristic) by the following method.

Negative active material slurries were respectively prepared by mixing 80 wt % of the prepared negative active materials according to Examples 1 and 2, 10 wt % of a graphite conductive material, and 10 wt % of a polytetrafluoroethylene binder in an N-methylpyrrolidone solvent. The negative active material slurries were coated on copper foil current collectors to prepare negative electrodes.

2016 coin-type half cells were fabricated by using the fabricated negative electrodes as a working electrode, a metal lithium sheet as a counter electrode, and a porous polypropylene film separator for insulating between the working electrode and the counter electrode. 1 (mol/L) $LiPF_6$ dissolved in a mixed solvent of propylene carbonate (PC), diethyl carbonate (DEC), and ethylene carbonate (EC) (volume ratio of PC:DEC:EC=1:1:1) was used as an electrolyte solution.

Electrical characteristics of the battery cells were examined under condition of 0.1 C ↔ 0.1 C (1 time charge and discharge) between 0.01 to 2.0 V.

After the charge and discharge, the negative active materials of Examples 1 and 2 were analyzed using XRD. The results are shown in the following FIG. 6 and FIG. 7.

Figure 6:
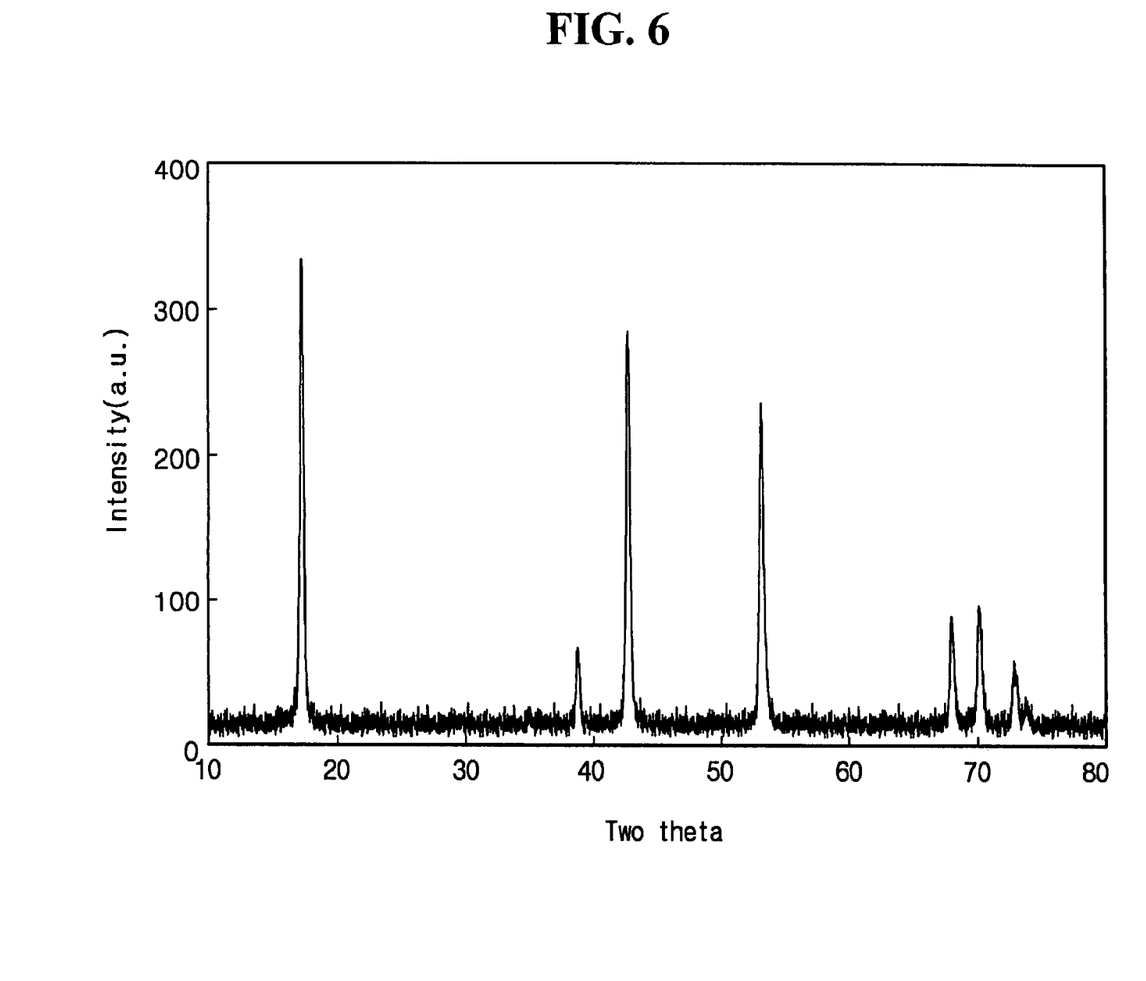
FIG. 6 is a graph showing an XRD measurement result of the negative active material according to Example 1 after charging.
Figure 7:
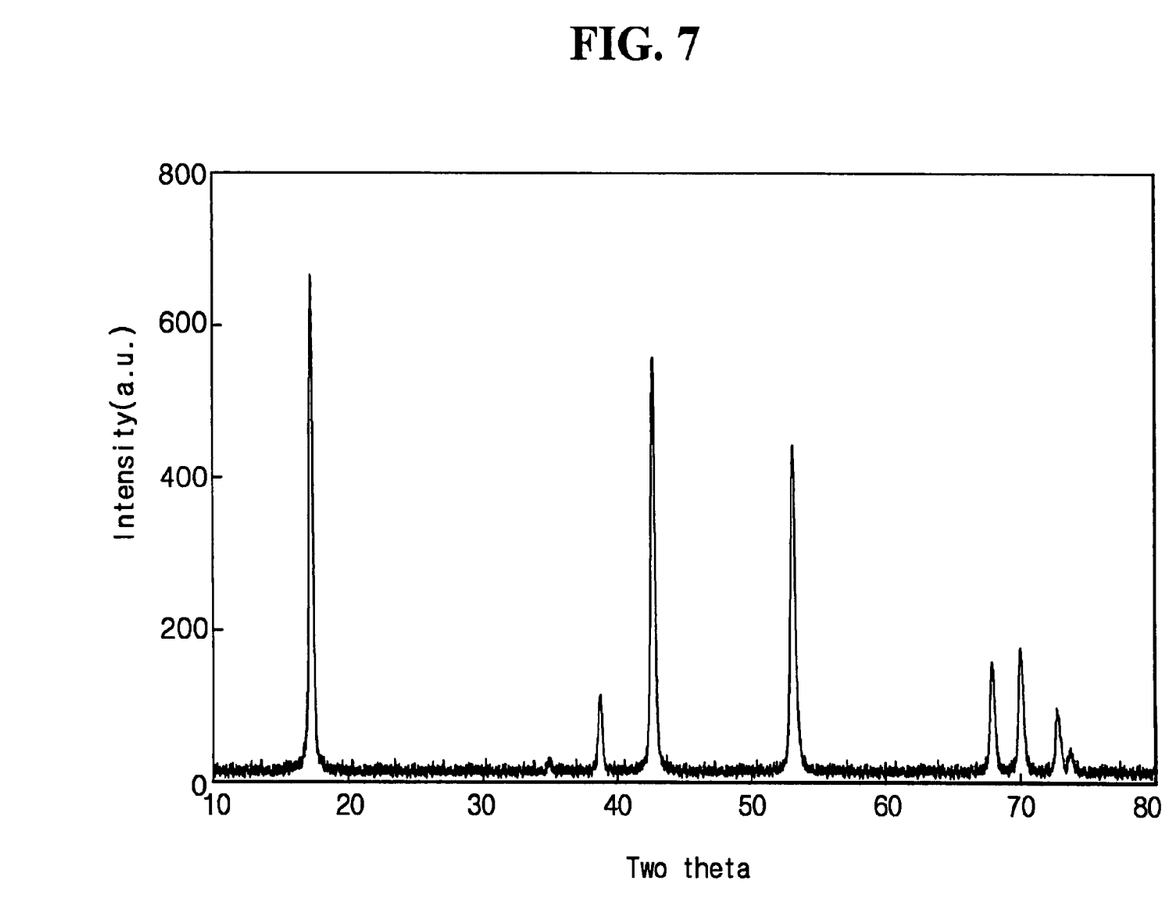
FIG. 7 is a graph showing an XRD measurement result of the negative active material according to Example 2 after charging.

FIG. 6 is a graph showing an XRD measurement result of the negative active material $Li_{2.1}Ti_{0.9}O_2$ of Example 1 where Li was inserted after charging, and FIG. 7 is a graph showing an XRD measurement result of the negative active material $Li_{2.1}Ti_{0.89}Mo_{0.01}O_2$ of Example 2 where Li was inserted after charging.

As shown in FIGS. 6 and 7, each lattice constant and volume change were measured by XRD of the negative materials according to Examples 1 and 2 on charging. The negative active material according to Example 1 had a lattice constant a of 2.681 Å, a lattice constant c of 5.1336 Å, and showed a 24.88% volume increase compared with before charging. The negative active material according to Example 2 had a lattice constant a of 2.685 Å, a lattice constant c of 5.1393 Å, and showed a 24.98% volume increase compared with before charging.

Further, initial discharge capacity per weight and initial efficiency of the negative active material during the charge and discharge were measured and the results are shown in the following Table 1.

TABLE 1

| | Initial discharge capacity (mAh/cc) | Initial efficiency (%) |
|---|---|---|
| Example 1 | 600 | 91 |
| Example 2 | 620 | 91 |

TABLE 1-continued

| | Initial discharge capacity (mAh/cc) | Initial efficiency (%) |
|---|---|---|
| Comparative Example 1 | 570 | 83 |
| Comparative Example 2 | 570 | 93 |

As shown in Table 1, the battery cells including the negative active materials according to Examples 1 and 2 showed excellent initial discharge capacity and/or charge and discharge efficiency compared with those including the negative active materials according to Comparative Examples 1 and 2.

Battery cells including the negative active materials according to Examples 3 to 18 were fabricated, and then initial discharge capacity per weight and initial efficiency during charge and discharge were measured according to the same method as above.

As a measurement result, the rechargeable lithium battery cells including the negative active materials according to Examples 3 to 18 showed equivalent initial discharge capacity and initial efficiency with the battery cell including the active material according to Example 2.

The negative active material of the present invention has high capacity and excellent cycle-life characteristics, and particularly can provide a rechargeable lithium battery having high capacity at high-rate charge and discharge.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable lithium battery comprising:
   a positive electrode comprising a positive active material being capable of intercalating and deintercalating lithium ions;
   a negative electrode comprising a negative active material of Formula 1:

$$Li_{1+x}Ti_{1-x-y}M_yO_{2+z} \qquad (1)$$

wherein, in the above Formula 1, $0.01 \leq x \leq 0.5$, $0 < y \leq 0.3$, $-0.2 \leq z \leq 0.2$, and M is an element selected from the group consisting of Fe, Ge, Al, and combinations thereof; and
   a non-aqueous electrolyte.

2. The rechargeable lithium battery of claim 1, wherein $0.05 \leq x \leq 0.2$, $0 \leq y \leq 0.2$, and $-0.1 \leq z \leq 0.1$.

3. The rechargeable lithium battery of claim 1, wherein M is Fe.

4. The rechargeable lithium battery of claim 1, wherein the negative active material has a c/a lattice constant ratio of 2.5 to 7.0 before intercalation of lithium.

5. The rechargeable lithium battery of claim 1, wherein the negative active material has a c/a lattice constant ratio of 0.3 to 3.0 after intercalation of lithium.

6. The rechargeable lithium battery of claim 1, wherein the negative active material has a change of 30% or less in a volume of a crystalline lattice by intercalation/deintercalation of lithium.

7. The rechargeable lithium battery of claim 1, wherein an average oxidation number of Ti in the negative active material is 2 to 4.

8. The rechargeable lithium battery of claim 1, wherein the negative active material has a redox potential of less than or equal to 1 V against a lithium metal.

9. The rechargeable lithium battery of claim 1, wherein the negative active material has a I(003)/I(104) intensity ratio ranging from 0.3 to 3 where I(003) is an intensity at a (003) plane and I(104) is an intensity at a (104) plane in an X-ray diffraction peak.

10. The rechargeable lithium battery of claim 1, wherein M is selected from the group consisting of Ge, Al, and combinations thereof.

* * * * *